United States Patent
Ainsley

(10) Patent No.: US 6,991,784 B2
(45) Date of Patent: Jan. 31, 2006

(54) SELECTED MIXTURE FOR ANIMAL LURE

(75) Inventor: Keith Ainsley, Cortland, OH (US)

(73) Assignee: Doc's Deer Farm and Scents, Cortland, OH (US)

( * ) Notice: Subject to any disclaimer, the term of this patent is extended or adjusted under 35 U.S.C. 154(b) by 286 days.

(21) Appl. No.: 09/524,928

(22) Filed: Mar. 14, 2000

(65) Prior Publication Data

US 2002/0085991 A1 Jul. 4, 2002

(51) Int. Cl.
A01N 25/02 (2006.01)

(52) U.S. Cl. .................. 424/84; 424/545; 424/546; 43/1

(58) Field of Classification Search .............. 424/84, 424/545, 546; 43/1
See application file for complete search history.

(56) References Cited

U.S. PATENT DOCUMENTS

| | | | | |
|---|---|---|---|---|
| 3,046,192 A | | 7/1962 | Bilyeu | |
| 4,667,430 A | * | 5/1987 | Ziese, Jr. | 43/1 |
| 4,773,177 A | * | 9/1988 | Gray et al. | 43/1 |
| 5,369,903 A | * | 12/1994 | Cox | 43/1 |
| 5,672,342 A | * | 9/1997 | Bell | 417/84 |
| 5,698,111 A | | 12/1997 | Newman | 210/767 |
| 5,896,692 A | * | 4/1999 | Collora et al. | 43/1 |
| 5,916,552 A | | 6/1999 | Perry | 424/84 |
| 4,944,940 A | * | 7/1999 | Christenson, II | 424/84 |

* cited by examiner

Primary Examiner—Neil S. Levy
(74) Attorney, Agent, or Firm—Robert G. Lev

(57) ABSTRACT

The present invention is a lure optimized for a particular animal such as deer. The optimized lure is made using urine from only two animals urinating at approximately the same time. The animals can be either male or female, but preferably, females in estrus are used for optimal results. This mixture of urine is not diluted in any manner with that of additional animals or preservatives. The urine for the lure is obtained by using a single stall exclusively for only two animals for the purpose of gathering urine. This technique has been especially effective in attracting wandering bucks in rut.

9 Claims, No Drawings

SELECTED MIXTURE FOR ANIMAL LURE

FIELD OF THE INVENTION

The present invention relates generally to the field of animal lures used for attracting selected animals. In particular, the present invention is directed to a having a particular mixture of animal urine devised for optimal attraction for selected animals, and a method of producing the lure.

BACKGROUND ART

Hunting wild animals, especially herd animals such as deer, is an art requiring the proper mix of intelligence, patience, endurance and the proper equipment. However, even all of these factors are not necessarily sufficient for a successful hunt. In many cases some of these factors are missing so that special assistance is necessary. One such form of assistance is provided by scent masking agents.

Because animals like deer rely heavily on their highly developed sense of smell to alert them to a variety of dangers, it is necessary for hunters to hide their scents, thereby avoiding alerting the deer to the presence of the hunters. Techniques for doing this have been used for thousands of years. Yet, this alone is seldom sufficient to guarantee success, especially to unpracticed or unskilled hunters.

While it is necessary to cover the scent indicating the presence of the hunters, it is also very helpful to provide some means to attract the animals to the hunters' vicinity. This is accomplished through the use of scent lures, some of which have been used for thousands of years, in some form or other, by hunters to attract their prey.

In the past century, the manufacture and sale of lures, including scented lures has become a major commercial enterprise. With respect to deer (the most widely hunted game animal in the United States) and especially the mature male of the species (the dominant buck, which is the object of most hunts), a lure is often used to attract a wandering buck to a hunter's vicinity so that the buck can be easily taken. The use of such lures is not limited to hunters but also can be used by photographers, or conservationists wanting to study or tag selected animals.

The ideal time for hunting bucks, especially mature or dominant bucks, is during the time that does go into heat or estrus so as to be sexually receptive to the bucks. Such does are attracted to any mature (sexually active) male deer. The mating season also induces the state of sexual excitement in males, commonly referred to as a "rut". During this time, bucks tend to become very predictable in their activities.

During this state, a buck will mark off his territory for breeding purposes as part of a search for receptive females, or as means for protecting an existing herd including females in estrus. Usually this is done by urination and other forms of marking. The buck will then attempt to prevent other bucks from entering his breeding territory (dominating that territory), and will herd any available does in estrus within the breeding territory so as to mate with as many of them as possible.

A standard method for a buck to mark its breeding territory is the use of a "mating scrape", which is usually an approximately circular area on the ground about two or three feet in diameter. This area is cleared of all leaves and debris by the buck pawing and scraping the area with its hooves. After the scrape has been made, the buck urinates down the tarsal gland on its leg over the scrape. The tarsal gland is a gland on the hock of a deer leg, and is used to communicate the buck's presence to other deer. The tarsal gland contains both sebaceous and sudorific glands connected to hair follicles that act as ducts to bring pheromone secretions to the surface of the bucks hide. These secretions form a musky dust on the hair follicles in the area of the bucks tarsal gland.

The urine picks up the dust from the hair follicles as it flows, and delivers the mixture to the femoral gland, located between the tarsal gland and the hoof. From there, the urine flows over the interdigital gland located on the hoof of the deer. The mixture of the urine and secretions from the three glands is then deposited on the ground which produces an odor indicative of the particular buck's presence.

As a result, the "mating scrape" is both a visual and olfactory signal for both bucks and does. Usually, a receptive doe entering the mating area so marked, will urinate on the scrape to signal her presence and her state of estrus. In the case of other bucks which come into the area, the "mating scrape" will be an immediate indication that another buck has already marked off that area as his breeding ground. Thus, the scrape will act as either a warning or a challenge to other bucks, as well as an invitation to does.

One strategy for hunters, or others seeking to capture or get close to a buck in heat, is the creation of a "mock scrape". This is done by imitating the bucks markings on the ground and applying an appropriate lure containing the scent of a buck in rut. However, this is not necessarily the optimum method of attracting a wandering rutting buck since a buck in rut is most interested in the scent of females in estrus, and there was always a chance that the buck may avoid the territory of another buck in rut, especially if there is some indication that the marked territory belongs to a larger and stronger animal. Consequently, many hunters and others hoping to come close to a buck in rut will use urine from a doe, preferably one already in estrus or heat.

Conventional methods of making deer lures usually includes a mixture of fermented tarsal glands of several deer. The fermenting generally takes place in deer urine, also obtained from several deer. The urine is usually a combination of buck, doe and fawn urine. As a result, a buck detecting such a scent will be led to believe that a large herd of deer is nearby. Such a heard may be indicated by the scent as including other bucks in rut. As a result, a wandering buck in rut may actually avoid the lure, despite the attraction of detecting does in estrus.

Since lures based upon deer urine have a refrigerator life of approximately three months, it is necessary to add preservatives in order to increase the shelf life of this product. As a result, the urine product is no longer natural, and may not operate nearly as effectively as a natural urine product. Also, there is another limitation in obtaining a deer urine lure since the preferred urine is from a doe in estrus, and the mating season is limited. As a result, the production of scented lures using the optimum deer urine ingredient (from a doe in estrus) is severely limited.

Because the collection of doe estrus urine is so difficult, and the product awkward to store, it is common in the conventional art to mix a variety of different does urines from many animals, as well as gland products, into a single batch of buck lure. The resulting product is less than optimal for luring a wandering buck in rut to a particular location. Accordingly, there is a substantial need for a buck lure formula constituted by a formula optimized to lure a single buck to a particular area. There is also a definite need for a system that easily produces such a lure.

SUMMARY OF THE INVENTION

Accordingly, it is one object of the present invention to overcome the drawbacks of the conventional art.

It is another object of the present invention to provide a formula for a buck lure that is optimized to draw a buck in rut to a particular area.

It is a further object of the present invention to provide a method by which an optimized buck lure can be produced.

It is an additional object of the present invention to provide a simplified system for producing a buck lure.

It is still another object of the present invention to provide an effective lure for a variety of different animals.

It is again a further object of the present invention to provide a system that optimizes the effectiveness of urine produced by animals for lure purposes.

These and other goals and objects of the present invention are achieved by an animal lure for a designated species including the urine of only two animals of that designated species.

Another embodiment of the present invention is manifested by a method of making a lure for an identified species of animal. The method includes the steps of limiting the use of a urine-gathering stall to only two animals. The urine is then gathered from the stall, and the lure is produced using only the urine gathered from that particular stall.

DETAILED DESCRIPTION OF THE PREFERRED EMBODIMENTS

It has been determined through experiments and observation of both free and penned deer that certain habits and characteristics predominate during the deer mating season. The lures of the present invention and the method for producing the subject lures are configured in response to these observations. Drawings are not needed to support the present invention since the written description of the constitution of the present invention and the techniques for making it are considered sufficient for one skilled in this technology.

It has been discovered that a buck in rut is most attracted to the scent of two does in estrus rather than a single doe in estrus or a herd containing a number of does in estrus. To a rutting buck, two does in estrus are always preferable to a single doe. On the other hand, a herd of deer containing at least one dominant buck is not nearly so attractive to a wandering buck in rut since he may have to fight to breed. Even if the presence of other males is not a deterrent (as it so often is), a large number of does (even those in estrus) tend to scatter upon the appearance of a new buck, and tend not to quickly reunite. As a result the buck is often left with only one doe in estrus. In contrast to this behavior of a large herd, a group limited to a single pair of does will quickly rejoin, even if initially startled into a flight which splits the two. As a result, if the wandering buck in rut is able to corner and acquire one doe, he will soon have the other. This understanding is instinctive to all male deer (as well as many other herd animals) as the optimum scenario for a wandering buck in rut.

Accordingly, the optimum buck lure will consist of the urine of only two does in estrus. To add the urine of more such doe, would simply serve to "confuse" the wandering buck, and lead him to become more wary of what smells to be a less than optimal situation. Cutting the urine of two does in estrus with the urine of fawns, bucks and does not in estrus, would also serve to increase the wandering buck's caution, and serve as a less effective lure. Any form of "cutting" the urine from the two does in estrus would simply lessen the strength and thus, effectiveness of buck lures made from the mixture. Likewise, the use of preservatives only serves to deplete the concentration of the two doe urine mixtures and thus, lessen its effectiveness as a buck lure. Accordingly, the use of pure urine from two different does in estrus is apparently the optimal lure for a wandering buck in rut.

Obtaining the optimal urine mixture of two does in estrus is problematical using conventional urine-gathering techniques. Normally, urine is gathered in special stalls used by a large number of different animals. Usually, such stalls include a system of troughs or underfloor conduits for gathering the urine. Typically, many animals are kept in such stalls so that there is a mixture of urine from many different animals, even if only a limited number of animals are using the stall at any one time. In many cases this situation is further complicated by the use of such stalls to feed the animals as well as gather urine. The result of conventional techniques must be that only a urine mixture from more than two animals can easily be collected for use in lures.

The optimal buck lure of the present invention is produced by carefully limiting the use of a single stall to only two does. No other animals are allowed into a selected stall that has been designated for two specific does in estrus. Feeding of the does is preferably not carried out in the selected urine-gathering stall. However, feeding can be done to lure the animal into the stall, as well as taking the animal out once the urination cycle is complete.

The urine gathering stall is used only for two does in estrus during the estrus cycle for each of the two. Afterwards, the stall can be scrubbed down, and if need be, disinfected before being used by two new does in estrus. It should be noted that conventional means, including floor/screens, filters and the like, are used to separate the feces from the urine. The urine from each deer is gathered using conventional trough arrangements while the feces is disposed of in the conventional manner.

Through long experimentation with the buck lures made from the urine of two does in estrus, it has been determined that the optimal effectiveness of the two urine mixture occurs when a first doe in estrus is allowed to urinate in the designated stall, and a second doe in estrus is led in as the first doe is lead out. The two does can also be left together for a short period of time to establish physical contact. It has been found that such physical contact tends to enhance hormone production of the second doe more certainly than mere visual contact between the two does. However, in many cases the same good results are achieved simply by the visual contact between the two does. Apparently the limited visual and physical contact between the first and second does coupled with the extremely strong smell of the freshly produced urine of the first doe leads to a maximum glandular production on the part of the second doe. The reasons for this phenomenon are not clear. It is only known that the limited visual and physical contact coupled with the maximum olfactory contact apparently enhances the glandular production of the second doe is estrus.

It should be noted that while the optimal lure for the wandering white-tailed buck in rut has been described above, the technique of the present invention is not limited thereto. The present invention is based upon observations made of white-tailed deer, both in captivity and in the wild. Accordingly, the techniques of the first preferred embodiment of the present invention are found to work best with white tailed deer. However, the present invention is not limited thereto. For example, the technique of using only two animals per stall can be used with other species. In particular, any herd animal, such white tailed deer, as elk, moose, mule deer, cariboo, or the like, can be used for making effective two-animal urine lures for the species.

Even additional species can be subjected to lures made from a urine mixture of a specific number of animals, depending upon characteristics of the species. For example, in some species only single-animal urine would be appropriate. While in other species, the urine of more than two animals would be appropriate, if limited to a specific optimal number, as is done with the two-doe urine lure of the first preferred embodiment of the present invention.

In another variation of the present invention, it has been discovered that an effective (although less than optimal) white tailed buck lure can be produced from the urine of two does not in estrus. This is done using the same techniques as previously described with deer in estrus. While the resulting mixture is less effective as a buck lure than that made from urine of deer in estrus, a reasonably effective buck lure can still be produced. The chief advantage of using urine from deer that are not in estrus is that the buck lure can be produced at any time of the year rather than only during the short estrus cycle of the white tailed deer.

There are other circumstances in which the technique of the present invention can be used in yet another embodiment. Besides using the urine of does in estrus to attract rutting bucks, there is another type of lure that can be used. For situations in which a dominate buck in rut has already established a territory and dominion over a herd of does, the intrusion of other rutting bucks within the first buck's matting territory will provoke an immediate investigation. Upon finding a wandering buck in its mating area, the dominant buck will seek immediate contact to repel the intruder. The use of a lure containing the urine of only two bucks in rut, gathered in accordance with the previous embodiments of the present invention, serves as a particularly effective attractant to a dominant buck already surrounded by does in his own mating area. In contrast, for such a situation, the domination of two new does will probably not be nearly as compelling as the protection of the herd by routing a competitor. The detection of a intruder into the dominant buck's mating area is greatly facilitated through the use of urine from only two bucks in rut. It has been discovered that the use of urine with more than two bucks is confusing to the dominant buck, and can often be interpreted by that buck as meaningless rather than a situation demanding immediate attention.

As with does in estrus, the technique of leading a second buck into the urine-gathering stall while the first buck is being removed tends to enhance production of hormones and resulting scents in the second buck as it urinates. As with the single stall used for two does in estrus, a single stall is used for only two bucks in rut, and is throughly cleaned afterwards before being used by other animals.

While a number of embodiments of the present invention have been described by way of example, the present invention is not limited thereby. Rather, the present invention should be construed to include any and all permutations, variations, modifications, adaptations and embodiments that would occur to one skilled in this art, once having been taught the present invention by the instant application. Accordingly, the present invention should be construed as being limited only by the following claims.

I claim:

1. An animal lure for whitetail deer, said lure comprising an operative component consisting of:
   the whitetail deer urine of only two does in estrus wherein the whitetail deer urine is gathered from a single gathering stall used only by said two does in estrus using a method consisting essentially of the steps of:
      limiting the use of a gathering stall to only two whitetailed deer does in estrus;
      gathering urine from said urine gathering stall; and,
      limiting each said lure to only urine gatherered from a single said urine gathering stall.

2. The lure of claim 1, wherein said urine is taken exclusively from a single stall used only by said two whitetailed deer does.

3. A method for making a lure for white tail deer, said method consisting essentially in the steps of:
   a) limiting use of a gathering stall to only two white-tailed does in estrus;
   b) gathering urine from said urine gathering stall; and,
   c) limiting each said lure to only urine gathered from a single said urine gathering stall.

4. The method of claim 3, wherein said stall is cleaned after a urination cycle of said two does in estrus before use by other animals is permitted.

5. The method of claim 3, wherein said first and second does in estrus are permitted to be in contact with each other immediately after said urination cycle of said first animal.

6. The method of claim 3, wherein the step of gathering urine includes leading a first doe in estrus out of the stall immediately after urination while a second doe in estrus is lead into the stall so that said does in estrus are within sight of each other.

7. The method of claim 3, wherein before the step of gathering urine, the first doe in estrus is lead out of the stall immediately after urination cycle while a second doe in estrus is lead into the stall so that said does in estrus are within sight of each other.

8. An animal lure for white tail deer, said lure comprising an operative component consisting of:
   the collected isolated whitetail deer urine of only two does in estrus, wherein the whitetail deer urine is collected from a single gathering stall whose use is limited to only to whitetailed does in estrus using a method consisting essentially of the steps of;
   limiting use of a gathering stall to only two whitetailed deer does in estrus;
   collecting whitetail deer urine from said urine gathering stall; and,
   limiting said lure to only urine gathered from a single said urine gathering stall.

9. The lure of claim 8, wherein said urine is taken exclusively from a single stall used only by said two does in estrus.

* * * * *